US010034276B2

(12) United States Patent
Han et al.

(10) Patent No.: US 10,034,276 B2
(45) Date of Patent: Jul. 24, 2018

(54) DOWNLINK DATA TRANSMISSION METHOD, BASE STATION, AND USER EQUIPMENT

(71) Applicant: HUAWEI TECHNOLOGIES CO., LTD., Shenzhen, Guangdong (CN)

(72) Inventors: Guanglin Han, Beijing (CN); Chen Chi, Beijing (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 68 days.

(21) Appl. No.: 14/668,362

(22) Filed: Mar. 25, 2015

(65) Prior Publication Data

US 2015/0201404 A1    Jul. 16, 2015

Related U.S. Application Data

(63) Continuation of application No. PCT/CN2012/082059, filed on Sep. 26, 2012.

(51) Int. Cl.
H04W 4/00 (2018.01)
H04W 72/04 (2009.01)
H04W 72/00 (2009.01)
H04W 72/12 (2009.01)

(52) U.S. Cl.
CPC ....... H04W 72/042 (2013.01); H04W 72/005 (2013.01); H04W 72/121 (2013.01)

(58) Field of Classification Search
CPC .................................... H04W 28/04
USPC .......................................... 370/329
See application file for complete search history.

(56) References Cited

U.S. PATENT DOCUMENTS 9,642,125 B2 * 5/2017 Kim ............... H04W 72/042
2007/0083667 A1 4/2007 Cooper
2007/0274343 A1 * 11/2007 Nishio ............ H04W 72/082
370/479

(Continued)

FOREIGN PATENT DOCUMENTS

CN    101548275    9/2009
CN    101714892    5/2010

(Continued)

OTHER PUBLICATIONS

International Search Report dated Apr. 18, 2013 for International Patent Application No. PCT/CN2012/082059.

(Continued)

Primary Examiner — Samina Choudhry
(74) Attorney, Agent, or Firm — Staas & Halsey LLP

(57) ABSTRACT

The present invention relates to the field of mobile communications, and provides a downlink data transmission method, a base station, and a user equipment. The method includes: assigning, by a base station, a first downlink data channel resource to N user equipments UEs, where N is an integer greater than 1; assigning, by the base station, a first downlink control channel resource to the N UEs; and sending, by the base station, first data on the first downlink data channel resource, and sending first scheduling control signaling on the first downlink control channel resource, where the first scheduling control signaling is used to notify the N UEs of the first downlink data channel resource, so that the N UEs receive the first data on the first downlink data channel resource.

20 Claims, 6 Drawing Sheets

(56) References Cited

U.S. PATENT DOCUMENTS

| | | | |
|---|---|---|---|
| 2008/0311942 A1* | 12/2008 | Kim | H04L 1/1854 |
| | | | 455/509 |
| 2011/0116465 A1 | 5/2011 | Miki et al. | |
| 2011/0124357 A1 | 5/2011 | Kim et al. | |
| 2012/0028668 A1* | 2/2012 | Lee | H04L 5/0053 |
| | | | 455/509 |
| 2012/0039229 A1 | 2/2012 | Etemad et al. | |
| 2012/0106490 A1* | 5/2012 | Nakashima | H04W 52/42 |
| | | | 370/329 |
| 2012/0207103 A1 | 8/2012 | Dai et al. | |

FOREIGN PATENT DOCUMENTS

| | | |
|---|---|---|
| CN | 101789823 | 7/2010 |
| CN | 102077670 | 5/2011 |
| CN | 102238621 | 11/2011 |
| WO | WO 2008/038088 | 4/2008 |
| WO | WO 2011/100326 A1 | 8/2011 |

OTHER PUBLICATIONS

International Search Report dated Apr. 18, 2013 in corresponding International Patent Application No. PCT/CN2012/082059.
Chinese Office Action dated Dec. 5, 2016 in corresponding Chinese Patent Application No. 201280004202.2, 6 pages.

* cited by examiner

DOWNLINK DATA TRANSMISSION METHOD, BASE STATION, AND USER EQUIPMENT

CROSS-REFERENCE

This application is a continuation of International Application No. PCT/CN2012/082059, filed on Sep. 26, 2012, which is hereby incorporated by reference in its entirety.

TECHNICAL FIELD

The present invention relates to the field of mobile communications, and in particular, to a downlink data transmission method, a base station, and a user equipment (User Equipment, UE).

BACKGROUND

In downlink data transmission of a Long Term Evolution (Long Term Evolution, LTE) communication system, a base station (for example, an evolved NodeB (Evolved NodeB, eNB)) configures a Physical Downlink Shared Channel (Physical Downlink Shared Channel, PDSCH) resource and a Physical Downlink Control Channel (Physical Downlink Control Channel, PDCCH) resource for each UE to be scheduled, where the PDSCH bears data sent by the base station to the UE, and the PDCCH corresponding thereto bears scheduling information related to the PDSCH. In a process of communicating the downlink data of the base station, the UE, upon finding the PDCCH sent by the base station to the UE in a corresponding control signaling search space, receives the downlink data on the corresponding PDSCH according to the scheduling information borne by the PDCCH, thereby completing the downlink data transmission from the base station to the UE.

However, in the existing technical solution, when the base station needs to send data having the same content to multiple UEs, multiple non-overlapping PDSCHs are required to bear the data repeatedly, and different PDCCH signaling needs to be generated correspondingly to send to each UE respectively, resulting in that the base station transfers a large amount of data repeatedly, which reduces transmission efficiency of the communication system.

SUMMARY

An objective of embodiments of the present invention is to provide a downlink data transmission method, a base station, and a UE, so as to solve the problem of low transmission efficiency of a communication system when an existing base station performs downlink data transmission.

In a first aspect, the method for sending downlink data includes:

assigning, by a base station, a first downlink data channel resource to N user equipments UEs, where N is an integer greater than 1; assigning, by the base station, a first downlink control channel resource to the N UEs; and sending, by the base station, first data on the first downlink data channel resource, and sending first scheduling control signaling on the first downlink control channel resource, where the first scheduling control signaling is used to notify the N UEs of the first downlink data channel resource, so that the N UEs receive the first data on the first downlink data channel resource.

In a first possible implementation of the first aspect, the sending, by the base station, the first scheduling control signaling on the first downlink control channel resource includes: sending, by the base station, N pieces of first scheduling control signaling respectively corresponding to the N UEs on the first downlink control channel resource, where the N pieces of first scheduling control signaling are used to respectively notify the N UEs of the first downlink data channel resource.

With reference to the first possible implementation of the first aspect, in a second possible implementation, the sending, by the base station, the N pieces of first scheduling control signaling on the first downlink control channel resource includes: scrambling, by the base station, the N pieces of first scheduling control signaling respectively by using N identifiers corresponding to the N UEs, where the N identifiers are configured by the base station respectively for the N UEs; and sending, by the base station, the N pieces of scrambled first scheduling control signaling on the first downlink control channel resource.

With reference to the first possible implementation of the first aspect or the second possible implementation of the first aspect, in a third possible implementation, before the sending, by the base station, the first scheduling control signaling on the first downlink control channel resource, the method further includes: assigning, by the base station, a second downlink data channel resource to one or more UEs among the N UEs; and after the assigning, by the base station, the second downlink data channel resource to the one or more UEs among the N UEs, the method further includes: sending, by the base station, second data on the second downlink data channel resource, where one or more pieces of first scheduling control signaling among the N pieces of first scheduling control signaling are further used to indicate the second downlink data channel resource, so that the one or more UEs respectively corresponding to the one or more pieces of first scheduling control signaling receive the second data on the second downlink data channel resource.

With reference to the first possible implementation of the first aspect or the second possible implementation of the first aspect, in a fourth possible implementation, before the sending, by the base station, the first scheduling control signaling on the first downlink control channel resource, the method further includes: assigning, by the base station, a third downlink data channel resource to one or more UEs among the N UEs; assigning, by the base station, a second downlink control channel resource to the one or more UEs; and after the assigning, by the base station, the second downlink control channel resource to the one or more UEs, the method further includes: sending, by the base station, third data on the third downlink data channel resource, and sending one or more pieces of second scheduling control signaling respectively corresponding to the one or more UEs on the second downlink control channel resource, where the one or more pieces of second scheduling control signaling are used to indicate the third downlink data channel resource, and the one or more pieces of second scheduling control signaling and the N pieces of first scheduling control signaling are in the same subframe, so that the one or more UEs receive the third data on the third downlink data channel resource.

In a fifth possible implementation of the first aspect, the sending, by the base station, the first scheduling control signaling on the first downlink control channel resource includes: sending, by the base station, one piece of first scheduling control signaling on the first downlink control channel resource, where the one piece of first scheduling control signaling is used to notify the N UEs of the first downlink data channel resource.

With reference to the fifth possible implementation of the first aspect, in a sixth possible implementation, the sending, by the base station, the one piece of first scheduling control signaling on the first downlink control channel resource includes: scrambling, by the base station, the one piece of first scheduling control signaling by using one identifier, where the one identifier is an identifier, notified by the base station to the N UEs, corresponding to one UE among the N UEs; and sending, by the base station, the one piece of first scheduling control signaling scrambled by using the one identifier on the first downlink control channel resource.

With reference to the fifth possible implementation of the first aspect, in a seventh possible implementation, the sending, by the base station, the one piece of first scheduling control signaling on the first downlink control channel resource includes: scrambling, by the base station, the one piece of first scheduling control signaling by using a common identifier, where the common identifier is configured by the base station for the N UEs; and sending, by the base station, the one piece of first scheduling control signaling scrambled by using the common identifier on the first downlink control channel resource.

With reference to the first aspect or any one of the possible implementations of the first aspect, in an eighth possible implementation, the sending, by the base station, the first data on the first downlink data channel resource includes: sending, by the base station, the first data by sending one protocol data unit on the first downlink data channel resource, where the protocol data unit includes first receive indication information, and the first receive indication information is used to respectively instruct each UE of the N UEs to receive the first data in the protocol data unit, or is used to respectively instruct each UE of the N UEs to discard fourth data in the protocol data unit.

With reference to the eighth possible implementation of the first aspect, in a ninth possible implementation, the protocol data unit further includes second receive indication information, and the second receive indication information is used to instruct one or more UEs among the N UEs to receive fifth data in the protocol data unit.

With reference to the first aspect or any one of the possible implementations of the first aspect, in a tenth possible implementation, before the sending, by the base station, the first data on the first downlink data channel resource, the method further includes: sending, by the base station, scheduling rule information of the first scheduling control signaling to the N UEs, so that the N UEs detect the first scheduling control signaling in a frame, a subframe, or a period complying with the scheduling rule information; and/or sending, by the base station, search space configuration information to the N UEs, so that the N UEs detect the first scheduling control signaling in a search space corresponding to the search space configuration information.

In a second aspect, the method for sending downlink data includes: receiving, by a first user equipment UE, first scheduling control signaling sent by a base station; and receiving, by the first UE, first data on a first downlink data channel resource indicated by the first scheduling control signaling, where the first downlink data channel resource is assigned by the base station to N UEs, N is an integer greater than 1, and the N UEs include a second UE and the first UE.

In a first possible implementation of the second aspect, after the receiving, by the first UE, the first scheduling control signaling sent by the base station, the method further includes: receiving, by the first UE, second data on a second downlink data channel resource indicated by the first scheduling control signaling.

In a second possible implementation of the second aspect, before the receiving, by the first UE, the first data on the first downlink data channel resource indicated by the first scheduling control signaling, the method further includes: receiving, by the UE, second scheduling control signaling in a subframe where the first scheduling control signaling is located; and after the receiving, by the UE, the second scheduling control signaling in the subframe where the first scheduling control signaling is located, the method further includes: receiving, by the UE, third data on a third downlink data channel resource indicated by the second scheduling control signaling.

With reference to the second aspect or any one of the possible implementations of the second aspect, in a third possible implementation, the receiving, by the first UE, the first scheduling control signaling sent by the base station includes: descrambling, by the first UE, the first scheduling control signaling by using an identifier corresponding to the first UE, and receiving the descrambled first scheduling control signaling.

With reference to the second aspect or any one of the possible implementations of the second aspect, in a fourth possible implementation, the receiving, by the first UE, the first scheduling control signaling sent by the base station includes: descrambling, by the first UE, the first scheduling control signaling by using an identifier corresponding to the second UE, and receiving the descrambled first scheduling control signaling, where the identifier corresponding to the second UE is notified by the base station; or descrambling, by the first UE, the first scheduling control signaling by using a common identifier of the N UEs, and receiving the descrambled first scheduling control signaling, where the common identifier is configured by the base station for the N UEs.

With reference to the second aspect or any one of the possible implementations of the second aspect, in a fifth possible implementation, the receiving the first data on the first downlink data channel resource includes: receiving, by the first UE, a protocol data unit on the first downlink data channel resource; obtaining, by the first UE, receive indication information in the protocol data unit; and receiving, by the first UE, the first data in the protocol data unit according to the receive indication information, or discarding, by the first UE, fourth data other than the first data in the protocol data unit according to the receive indication information.

With reference to the fifth possible implementation of the second aspect, in a sixth possible implementation, the protocol data unit further includes second receive indication information, and the second receive indication information is used to instruct the first UE to receive fifth data in the protocol data unit.

With reference to the second aspect or any one of the possible implementations of the second aspect, in a seventh possible implementation, before the receiving, by the first UE, the first scheduling control signaling sent by the base station, the method further includes: receiving, by the first UE, scheduling rule information of the first scheduling control signaling sent by the base station, where the scheduling rule information notifies the first UE of information about a frame, a subframe, or a period for receiving the first scheduling control signaling; and the receiving, by the first UE, the first scheduling control signaling sent by the base station includes: detecting, by the first UE, the first scheduling control signaling in the frame, the subframe, or the period of the scheduling rule information; or before the receiving, by the first UE, the first scheduling control signaling sent by the base station, the method further includes: receiving, by the first UE, search space configuration information sent by the base station; and the receiving, by the first UE, the first scheduling control signaling sent by the base station includes: detecting, by the first UE, the first scheduling control signaling in a search space corresponding to the search space configuration information.

In a third aspect, the base station includes: a first data channel assigning unit, configured to assign a first downlink data channel resource to N user equipments UEs, where N is an integer greater than 1; a first control channel assigning unit, configured to assign a first downlink control channel resource to the N UEs; a first data sending unit, configured to obtain the first downlink data channel resource transferred by the first data channel assigning unit, and send first data on the first downlink data channel resource; and a first signaling sending unit, configured to obtain the first downlink control channel resource from the first control channel assigning unit, and send first scheduling control signaling on the first downlink control channel resource, where the first scheduling control signaling is used to notify the N UEs of the first downlink data channel resource, so that the N UEs receive the first data on the first downlink data channel resource.

In a first possible implementation of the third aspect, the first signaling sending unit is specifically configured to send N pieces of first scheduling control signaling respectively corresponding to the N UEs on the first downlink control channel resource, where the N pieces of first scheduling control signaling are used to respectively notify the N UEs of the first downlink data channel resource.

With reference to the first possible implementation of the third aspect, in a second possible implementation, the first signaling sending unit includes: a first scrambling subunit, configured to scramble the N pieces of first scheduling control signaling respectively by using N identifiers corresponding to the N UEs, where the N identifiers are configured by the base station respectively for the N UEs; and a first sending subunit, configured to receive the N pieces of scrambled first scheduling control signaling from the first scrambling subunit, and send the N pieces of scrambled first scheduling control signaling on the first downlink control channel resource.

With reference to the first possible implementation of the third aspect or the second possible implementation of the third aspect, in a third possible implementation, the base station further includes: a second data channel assigning unit, configured to assign a second downlink data channel resource to one or more UEs among the N UEs; and a second data sending unit, configured to obtain the second downlink data channel resource from the second data channel assigning unit, and send second data on the second downlink data channel resource; where one or more pieces of first scheduling control signaling among the N pieces of first scheduling control signaling are further used to indicate the second downlink data channel resource, so that one or more UEs respectively corresponding to the one or more pieces of first scheduling control signaling receive the second data on the second downlink data channel resource.

With reference to the first possible implementation of the third aspect or the second possible implementation of the third aspect, in a fourth possible implementation, the base station further includes: a third data channel assigning unit, configured to assign a third downlink data channel resource to one or more UEs among the N UEs; a second control channel assigning unit, configured to assign a second downlink control channel resource to the one or more UEs; a third data sending unit, configured to obtain the third downlink data channel resource from the third data channel assigning unit, and send third data on the third downlink data channel resource; and a second signaling sending unit, configured to obtain the second downlink control channel resource from the second control channel assigning unit, and send one or more pieces of second scheduling control signaling respectively corresponding to the one or more UEs on the second downlink control channel resource, where the one or more pieces of second scheduling control signaling are used to indicate the third downlink data channel resource, and the one or more pieces of second scheduling control signaling and the N pieces of first scheduling control signaling are in the same subframe, so that the one or more UEs receive the third data on the third downlink data channel resource.

In a fifth possible implementation of the third aspect, the first signaling sending unit is specifically configured to send one piece of first scheduling control signaling on the first downlink control channel resource, where the one piece of first scheduling control signaling is used to notify the N UEs of the first downlink data channel resource.

With reference to the fifth possible implementation of the third aspect, in a sixth possible implementation, the first signaling sending unit includes: a second scrambling subunit, configured to scramble the one piece of first scheduling control signaling by using one identifier, where the one identifier is an identifier, notified by the base station to the N UEs, corresponding to one UE among the N UEs; and a second sending subunit, configured to receive the one piece of scheduling control signaling scrambled by using the one identifier from the second scrambling subunit, and send the one piece of first scheduling control signaling scrambled by using the one identifier on the first downlink control channel resource.

With reference to the fifth possible implementation of the third aspect, in a seventh possible implementation, the first signaling sending unit includes: a third scrambling subunit, configured to scramble the one piece of first scheduling control signaling by using a common identifier, where the common identifier is configured by the base station for the N UEs; and a third sending subunit, configured to receive the one piece of first scheduling control signaling scrambled by using the common identifier from the third scrambling subunit, and send the one piece of first scheduling control signaling scrambled by using the common identifier on the first downlink control channel resource.

With reference to the third aspect or any one of the possible implementations of the third aspect, in an eighth possible implementation, the first data sending unit is specifically configured to send the first data by sending one protocol data unit on the first downlink data channel resource, where the protocol data unit includes first receive indication information, and the first receive indication information is used to respectively instruct each UE of the N UEs to receive the first data in the protocol data unit, or used to respectively instruct each UE of the N UEs to discard fourth data in the protocol data unit.

With reference to the eighth possible implementation of the third aspect, in a ninth possible implementation, the protocol data unit further includes second receive indication information, and the second receive indication information is used to instruct one or more UEs among the N UEs to receive fifth data in the protocol data unit.

With reference to the third aspect or any one of the possible implementations of the third aspect, in a tenth possible implementation, the base station further includes: a first information sending unit, configured to send scheduling rule information of the first scheduling control signaling to the N UEs, so that the N UEs detect the first scheduling control signaling in a frame, a subframe, or a period complying with the scheduling rule information; and/or a second information sending unit, configured to send search space configuration information to the N UEs, so that the N UEs detect the first scheduling control signaling in a search space corresponding to the search space configuration information.

In a fourth aspect, the user equipment UE includes: a first signaling receiving unit, configured to receive first scheduling control signaling sent by a base station; and a first data receiving unit, configured to receive the first scheduling control signaling transferred by the first signaling receiving unit, and receive first data on a first downlink data channel resource indicated by the first scheduling control signaling, where the first downlink data channel resource is configured by the base station for N UEs, N is an integer greater than 1, and the N UEs includes a second UE and the UE.

In a first possible implementation of the fourth aspect, the UE further includes: a second data receiving unit, configured to receive the first scheduling control signaling transferred by the first signaling receiving unit, and receive second data on a second downlink data channel resource indicated by the first scheduling control signaling.

In a second possible implementation of the fourth aspect, the UE further includes: a second signaling receiving unit, configured to receive second scheduling control signaling in a subframe where the first scheduling control signaling is located; and a third data receiving unit, configured to receive the second scheduling control signaling transferred by the second signaling receiving unit, and receive third data on a third downlink data channel resource indicated by the second scheduling control signaling.

With reference to the fourth aspect or any one of the possible implementations of the fourth aspect, in a third possible implementation, the first signaling receiving unit is specifically configured to descramble the first scheduling control signaling by using an identifier corresponding to the UE, and receive the descrambled first scheduling control signaling.

With reference to the fourth aspect or any one of the possible implementations of the fourth aspect, in a fourth possible implementation, the first signaling receiving unit is specifically configured to descramble the first scheduling control signaling by using an identifier corresponding to the second UE, and receive the descrambled first scheduling control signaling, where the identifier corresponding to the second UE is notified by the base station; or specifically configured to descramble the first scheduling control signaling by using a common identifier of the N UEs, and receive the descrambled first scheduling control signaling, where the common identifier is configured by the base station for the N UEs.

With reference to the fourth aspect or any one of the possible implementations of the fourth aspect, in a fifth possible implementation, the first data receiving unit includes: a protocol data unit receiving subunit, configured to receive a protocol data unit on the first downlink data channel resource; a receive indication information obtaining subunit, configured to receive the protocol data unit transferred by the protocol data unit receiving subunit, and obtain receive indication information in the protocol data unit and a receiving subunit, configured to receive the receive indication information transferred by the receive indication information obtaining subunit, and receive the first data in the protocol data unit according to the receive indication information; or discard fourth data other than the first data in the protocol data unit according to the receive indication information.

With reference to the fifth possible implementation of the fourth aspect, in a sixth possible implementation, the protocol data unit further includes second receive indication information, and the second receive indication information is used to instruct the first UE to receive fifth data in the protocol data unit.

With reference to the fourth aspect or any one of the possible implementations of the fourth aspect, in a seventh possible implementation, the UE further includes: a scheduling rule information receiving unit, configured to receive scheduling rule information of the first scheduling control signaling sent by the base station, where the scheduling rule information notifies the UE of information about a frame, a subframe, or a period for receiving the first scheduling control signaling; and the first signaling receiving unit is specifically configured to receive the scheduling rule information transferred by the scheduling rule information receiving unit, and detect the first scheduling control signaling in the frame, the subframe, or the period complying with the scheduling rule information; or the UE further includes: a search space configuration information receiving unit, configured to receive search space configuration information sent by the base station; and the first signaling receiving unit is specifically configured to receive the search space configuration information transferred by the search space configuration information receiving unit, and detect the first scheduling control signaling in a search space corresponding to the search space configuration information.

In a fifth aspect, the base station includes: a processor, configured to assign a first downlink data channel resource to N user equipments UEs, and assign a first downlink control channel resource to the N UEs, where N is an integer greater than 1; and an antenna, configured to obtain the first downlink data channel resource from the processor, and send first data on the first downlink data channel resource; and obtain the first downlink control channel resource from the processor, and send first scheduling control signaling on the first downlink control channel resource, where the first scheduling control signaling is used to notify the N UEs of the first downlink data channel resource, so that the N UEs receive the first data on the first downlink data channel resource.

In a first possible implementation of the fifth aspect, the antenna is specifically configured to send N pieces of first scheduling control signaling respectively corresponding to the N UEs on the first downlink control channel resource, where the N pieces of first scheduling control signaling are used to respectively notify the N UEs of the first downlink data channel resource.

With reference to the first possible implementation of the fifth aspect, in a second possible implementation, the processor is specifically configured to scramble the N pieces of first scheduling control signaling respectively by using N identifiers corresponding to the N UEs, where the N identifiers are configured by the base station respectively for the N UEs; and the antenna is specifically configured to receive the N pieces of scrambled first scheduling control signaling from the processor, and send the N pieces of scrambled first scheduling control signaling on the first downlink control channel resource.

With reference to the first possible implementation of the fifth aspect or the second possible implementation of the fifth aspect, in a third possible implementation, the processor is further configured to assign a second downlink data channel resource to one or more UEs among the N UEs; and the antenna is further configured to obtain the second downlink data channel resource from the processor, and send second data on the second downlink data channel resource; where one or more pieces of first scheduling control signaling among the N pieces of first scheduling control signaling are further used to indicate the second downlink data channel resource, so that one or more UEs respectively corresponding to the one or more pieces of first scheduling control signaling receive the second data on the second downlink data channel resource.

With reference to the first possible implementation of the fifth aspect or the second possible implementation of the fifth aspect, in a fourth possible implementation, the processor is further configured to assign a third downlink data channel resource to one or more UEs among the N UEs, and further configured to assign a second downlink control channel resource to the one or more UEs; and the antenna is further configured to obtain the third downlink data channel resource from the processor, and send the third data on the third downlink data channel resource; and further configured to obtain the second downlink control channel resource from the processor, and send one or more pieces of second scheduling control signaling respectively corresponding to the one or more UEs on the second downlink control channel resource, where the one or more pieces of second scheduling control signaling are used to indicate the third downlink data channel resource, and the one or more pieces of second scheduling control signaling and the N pieces of first scheduling control signaling are in the same subframe, so that the one or more UEs receive the third data on the third downlink data channel resource.

In a fifth possible implementation of the fifth aspect, the antenna is specifically configured to send one piece of first scheduling control signaling on the first downlink control channel resource, where the one piece of first scheduling control signaling is used to notify the N UEs of the first downlink data channel resource.

With reference to the fifth possible implementation of the fifth aspect, in a sixth possible implementation, the processor is specifically configured to scramble the one piece of scheduling control signaling by using one identifier, where the one identifier is an identifier, notified by the base station to the N UEs, corresponding to one UE among the N UEs; and the antenna is specifically configured to receive the one piece of first scheduling control signal scrambled by using the one identifier from the processor, and send the one piece of first scheduling control signaling scrambled by using the one identifier on the first downlink control channel resource.

With reference to the fifth possible implementation of the fifth aspect, in a seventh possible implementation, the processor is specifically configured to scramble the one piece of first scheduling control signaling by using a common identifier, where the common identifier is configured by the base station for the N UEs; and the antenna is specifically configured to receive the one piece of first scheduling control signal scrambled by using the common identifier from the processor, and send the one piece of first scheduling control signaling scrambled by using the common identifier on the first downlink control channel resource.

With reference to the fifth aspect or any one of the possible implementations of the fifth aspect, in an eighth possible implementation, the antenna is specifically configured to send the first data by sending one protocol data unit on the first downlink data channel resource, where the protocol data unit includes first receive indication information, and the first receive indication information is used to respectively instruct each UE of the N UEs to receive the first data in the protocol data unit, or used to respectively instruct each UE of the N UEs to discard fourth data in the protocol data unit.

With reference to the eighth possible implementation of the fifth aspect, in a ninth possible implementation, the protocol data unit further includes second receive indication information, and the second receive indication information is used to instruct one or more UEs among the N UEs to receive fifth data in the protocol data unit.

With reference to the fifth aspect or any one possible implementations of the fifth aspect, in a tenth possible implementation, the antenna is further configured to send scheduling rule information of the first scheduling control signaling to the N UEs, so that the N UEs detect the first scheduling control signaling in a frame, a subframe, or a period complying with the scheduling rule information; and/or the antenna is further configured to send search space configuration information to the N UEs, so that the N UEs detect the first scheduling control signaling in a search space corresponding to the search space configuration information.

In a sixth aspect, the user equipment UE includes an antenna, where the antenna is configured to receive first scheduling control signaling sent by a base station; and the antenna is further configured to receive first data on a first downlink data channel resource indicated by the first scheduling control signaling, where the first downlink data channel resource is assigned by the base station to N UEs, N is an integer greater than 1, and the N UEs include a second UE and the first UE.

In a first possible implementation of the sixth aspect, the antenna is specifically configured to receive second data on a second downlink data channel resource indicated by the first scheduling control signaling.

In a second possible implementation of the sixth aspect, the antenna is further configured to receive second scheduling control signaling in a subframe where the first scheduling control signaling is located; and receive third data on a third downlink data channel resource indicated by the second scheduling control signaling.

With reference to the sixth aspect or any one of the possible implementations of the sixth aspect, in a third possible implementation, the antenna is specifically configured to descramble the first scheduling control signaling by using an identifier corresponding to the UE, and receive the descrambled first scheduling control signaling.

With reference to the sixth aspect or any one of the possible implementations of the sixth aspect, in a fourth possible implementation, the antenna is specifically configured to descramble the first scheduling control signaling by using an identifier corresponding to the second UE, and receive the descrambled first scheduling control signaling, where the identifier corresponding to the second UE is notified by the base station; or the antenna is specifically configured to descramble the first scheduling control signaling by using a common identifier of the N UEs, and receive the descrambled first scheduling control signaling, where the common identifier is configured by the base station for the N UEs.

With reference to the sixth aspect or any one of the possible implementations of the sixth aspect, in a fifth possible implementation, the antenna is specifically configured to receive a protocol data unit on the first downlink data channel resource; obtain receive indication information in the protocol data unit; and receive the first data in the protocol data unit according to the receive indication information, or discard fourth data other than the first data in the protocol data unit according to the receive indication information.

With reference to the fifth possible implementation of the sixth aspect, in a sixth possible implementation, the protocol data unit further includes second receive indication information, and the second receive indication information is used to instruct the first UE to receive fifth data in the protocol data unit.

With reference to the sixth aspect or any one of the possible implementations of the sixth aspect, in a seventh possible implementation, the antenna is further configured to receive scheduling rule information of the first scheduling control signaling sent by the base station, where the scheduling rule information notifies the UE of information about a frame, a subframe, or a period for receiving the first scheduling control signaling; and detect the first scheduling control signaling in the frame, the subframe, or the period of the scheduling rule information; or the antenna is further configured to receive search space configuration information sent by the base station; and detect the first scheduling control signaling in a search space corresponding to the search space configuration information.

In the embodiments of the present invention, a base station may, when being required to send the same data to multiple UEs, send downlink data by using the same downlink data channel resource, so that each UE receives the same data from the same downlink data channel resource. This saves a transmission bandwidth, and improves a resource utilization rate of a communication system.

DESCRIPTION OF EMBODIMENTS

To make the objectives, technical solutions, and advantages of the present invention more comprehensible, the following further describes the present invention in detail with reference to the accompanying drawings and embodiments. It is understandable that the specific embodiments are merely used to explain the present invention and are not intended to limit the present invention.

In the embodiments of the present invention, a base station may, when being required to send the same data to multiple UEs, send downlink data by using the same downlink data channel resource, so that each UE receives the same data from the same downlink data channel resource. This saves a transmission bandwidth, and improves a resource utilization rate of a communication system.

Figure 1:
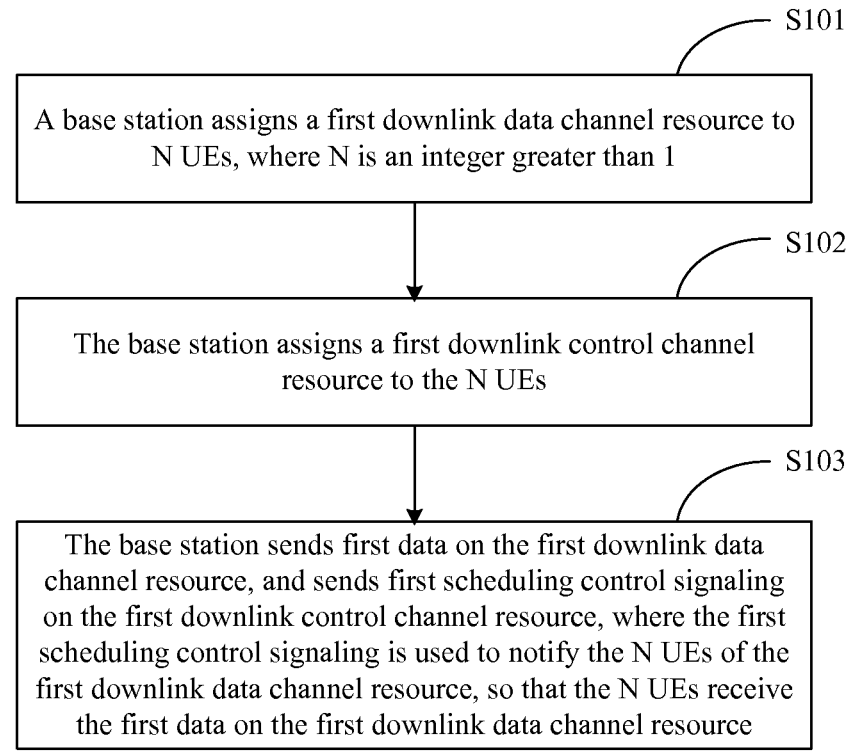
FIG. 1 is a flowchart for implementing a method for sending downlink data according to an embodiment of the present invention.

FIG. 1 shows an implementation procedure of a method for sending downlink data according to an embodiment of the present invention. In this embodiment, a procedure executing entity is a base station, which may specifically include but is not limited to a base station type such as eNB. The implementation procedure thereof is described in detail as follows:

In step S101, a base station assigns a first downlink data channel resource to N UEs, where N is an integer greater than 1.

In this embodiment, the base station assigns the same downlink data channel resource to more than two UEs, and sends data to more than one UE by using the same downlink data channel resource.

In step S102, the base station assigns a first downlink control channel resource to the N UEs.

In this embodiment, the base station assigns the downlink control channel resource to the N UEs, so as to send scheduling control signaling to the UEs on the assigned downlink control channel resource.

In step S103, the base station sends first data on the first downlink data channel resource, and sends first scheduling control signaling on the first downlink control channel resource, where the first scheduling control signaling is used to notify the N UEs of the first downlink data channel resource, so that the N UEs receive the first data on the first downlink data channel resource.

In this embodiment, the base station may send N pieces of first scheduling control signaling respectively corresponding to the N UEs on the first downlink control channel resource, where the N pieces of first scheduling control signaling are used to respectively notify the N UEs of the first downlink data channel resource. The base station may also send one piece of first scheduling control signaling on the first downlink control channel resource to notify the N UEs of the first downlink data channel resource. The specific method for sending the scheduling control signaling is described in detail in following embodiments, and is not described in this embodiment.

In the embodiments of the present invention, the downlink data channel includes but is not limited to one or more of a PDSCH and a broadcast channel, and the downlink control channel includes but is not limited to one or more of a PDCCH, a dedicated physical data channel (Dedicated Physical Data Channel, DPDCH), and an extended PDCCH (Extended PDCCH, E-PDCCH), where no limit is set herein. It should be noted that in this embodiment and following embodiments, the scheduling control signaling includes scheduling information related to the downlink data channel resource indicated thereby. Specifically, the scheduling information includes but is not limited to one or more of resource block (Resource Block) location indication, resource allocation type (Resource Allocation Type), modulation and coding scheme (Modulation and Coding Scheme), hybrid automatic repeat request process number (Hybrid Automatic Repeat Request Process Number, HARQ Process Number), redundancy version (Redundancy Version), and transmission power control command (Transmission Power Control Command, TPC Command) of the downlink data channel resource, which will not be described repeatedly in the following related embodiments.

In the prior art, a UE needs to decode data on a downlink data channel resource by using an identifier assigned by a base station, where the identifier is a dedicated identifier assigned by the base station to the UE; therefore, when the base station needs to send data having the same content to multiple UEs, the base station must send the data respectively to the multiple UEs by using multiple non-overlapping downlink data channel resources, so that the multiple UEs can receive the data successfully. This transmission mode causes the base station to transfer a large amount of data repeatedly in the transmission process, which reduces system transmission efficiency. However, in this embodiment, by using the steps described above, the base station may send data to multiple UEs on the same downlink data channel resource, and instruct, by using the scheduling control signaling, the multiple UEs to receive the data by using the same downlink data channel resource. This greatly saves resources of a communication system, and improves transmission efficiency of the communication system.

As an embodiment of the present invention, in step S103, specifically, the base station may send N pieces of first scheduling control signaling respectively corresponding to the N UEs on the first downlink control channel resource, where N pieces of first scheduling control signaling are respectively used to notify the N UEs of the first downlink data channel resource, so that the N UEs respectively receive, according to the first scheduling control signaling sent by the base station and detected by the UEs, the first data sent by the base station on the first downlink data channel resource.

As an embodiment of the present invention, the sending, by the base station, the N pieces of first scheduling control signaling respectively corresponding to the N UEs on the first downlink control channel resource specifically is:

scrambling, by the base station, the N pieces of first scheduling control signaling by using N identifiers corresponding to the N UEs, where the N identifiers are configured by the base station respectively for the N UEs; and sending, by the base station, the N pieces of scrambled first scheduling control signaling on the first downlink control channel resource.

The identifiers are used by the UEs to descramble the scheduling control signaling and by the base station to scramble the scheduling control signaling.

In this embodiment, the base station may configure a different identifier respectively for the N UEs, and configure N identifiers respectively for the N UEs by using related control signaling or interaction message, for example, a radio resource control protocol (Radio Resource Control, RRC) message.

Hence, regarding first scheduling control signaling to be sent to a UE, the base station scrambles the first scheduling control signaling by using the identifier configured to the UE, so that the UE may descramble the detected first scheduling control signaling according to the identifier configured by the base station. If the descrambling is successful, the UE needs to receive downlink data according to an instruction of the first scheduling control signaling.

It should be noted that in the embodiment of the present invention, the scrambling, by the base station, the scheduling control signaling by using the identifier configured to the UE may be scrambling the scheduling control signaling by using the identifier, or scrambling a cyclic redundancy check (Cyclic Redundancy Check, CRC) of the scheduling control signaling. Moreover, the identifier configured by the base station for the UE may be a cell radio network temporary identifier (Cell Radio Network Temporary Identify, C-RNTI) or an identifier configured automatically by the base station for scrambling the scheduling control signaling. The implementation will not be described repeatedly in the following embodiments.

As an embodiment of the present invention, before the sending, by the base station, the N pieces of first scheduling control signaling on the first downlink control channel resource, the method further includes:

assigning, by the base station, a second downlink data channel resource to one or more UEs among the N UEs; and sending, by the base station, second data on the second downlink data channel resource, where one or more pieces of first scheduling control signaling among the N pieces of first scheduling control signaling are further used to indicate the second downlink data channel resource, so that the one or more UEs respectively corresponding to the one or more pieces of first scheduling control signaling receive the second data on the second downlink data channel resource.

Figure 2:
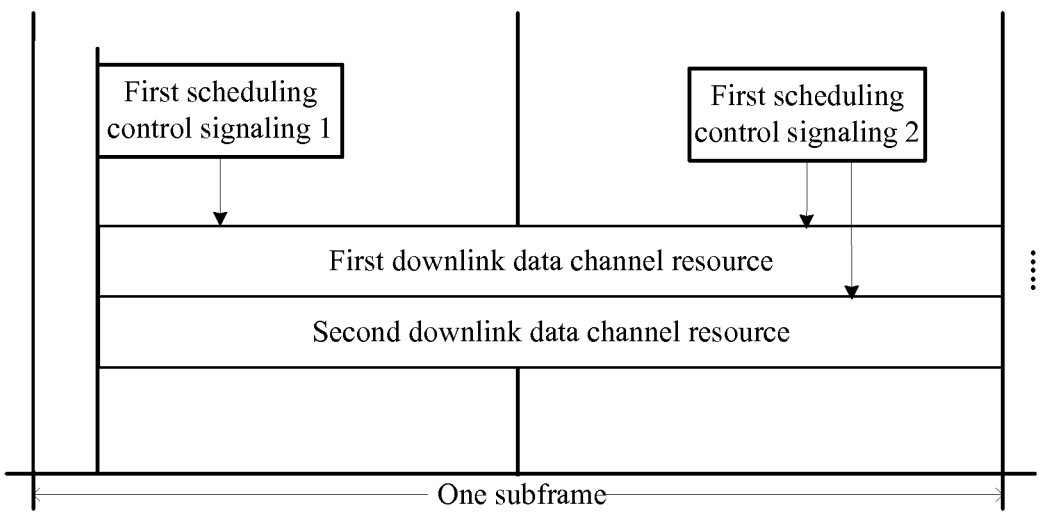
FIG. 2 is a schematic diagram for implementing a method for sending downlink data according to an embodiment of the present invention.

Specifically, FIG. 2 shows a schematic diagram for implementing the embodiment. Referring to FIG. 2, in one scheduling process of the base station, the downlink control channel resource and the downlink data channel resource are multiplexed in the same subframe. In FIG. 2, a black area on the left in a direction of the horizontal axis is the scheduling control signaling on the downlink control channel resource. Specifically, first scheduling control signaling 1 sent to UE 1 and first scheduling control signaling 2 sent to UE 2 both indicate the first downlink data channel resource, so that UE 1 and UE 2 both receive data on the first downlink data channel resource; moreover, the first scheduling control signaling 2 further indicates the second downlink data channel resource, so that UE 2 can also receive data on the second downlink data channel resource. Hence, the base station does not need to send and configure separate scheduling control signaling for the second data, but only needs to add information for indicating the second downlink data channel resource to one or more pieces of first scheduling control signaling among the N pieces of first scheduling control signaling, and one or more UEs among the N UEs may receive, according to the instruction, the first data on the first downlink data channel resource and the second data on the second downlink data channel resource. Based on this principle, the base station may, according a scheduling condition of each UE and by using one piece of scheduling control signaling, instruct the UE to obtain data on two or more downlink data channel resources, so as to greatly transmission efficiency of the control channel.

As another embodiment of the present invention, before the sending, by the base station, the N pieces of first scheduling control signaling on the first downlink control channel resource, the method further includes:

assigning, by the base station, a third downlink data channel resource to one or more UEs among the N UEs;

assigning, by the base station, a second downlink control channel resource to the one or more UEs; and sending, by the base station, third data on the third downlink data channel resource, and sending one or more pieces of second scheduling control signaling respectively corresponding to the one or more UEs on the second downlink control channel resource, where the one or more pieces of second scheduling control signaling are used to indicate the third downlink data channel resource, and the one or more pieces of second scheduling control signaling and the N pieces of first scheduling control signaling are in the same subframe, so that the one or more UEs receive the third data on the third downlink data channel resource.

Figure 3:
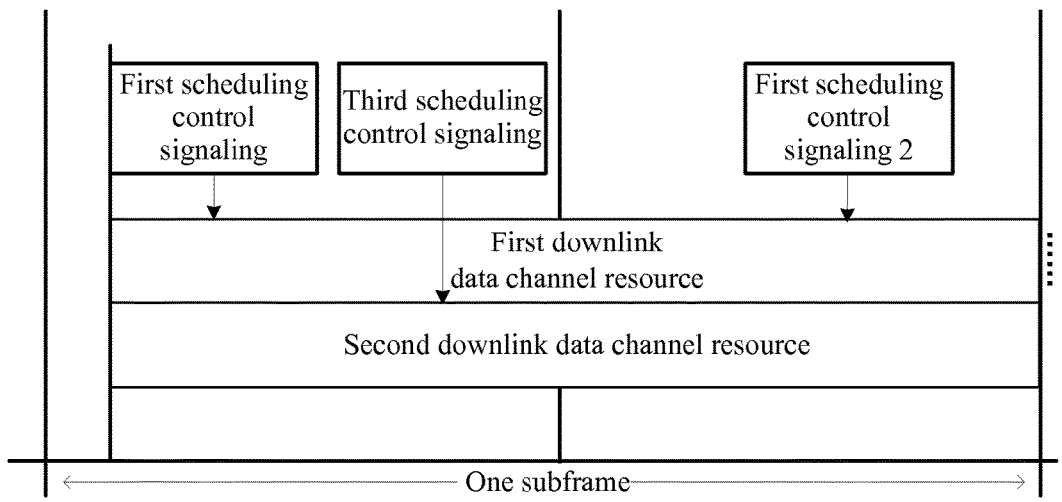
FIG. 3 is a schematic diagram for implementing a method for sending downlink data according to an embodiment of the present invention.

Specifically, FIG. 3 shows a schematic diagram for implementing the embodiment. Referring to FIG. 3, in a scheduling process of the base station, in one subframe, first scheduling control signaling 1 sent to UE 1 and first scheduling control signaling 2 sent to UE 2 both indicate the first downlink data channel resource, so that UE 1 and UE 2 both receive data on the first downlink data channel resource; moreover, second scheduling control signaling may also be sent to UE 1 within the subframe, where the second scheduling control signaling further indicates the thirddownlink data channel resource, so that UE 1 can also receive data on the third downlink data channel resource. In this embodiment, UEs that need to receive the third data on the third downlink data channel resource may, in the same subframe where the first scheduling control signaling is detected, detect the second scheduling control signaling indicating the third downlink data channel resource, and receive the third data on the third downlink data channel resource. Hence, in one scheduling process, data over multiple downlink data channel resources is transferred, which greatly improves the transmission efficiency of the system.

As an embodiment of the present invention, in step S103, specifically, the base station may also send only one piece of first scheduling control signaling on the first downlink control channel resource, where the first scheduling control signaling is used to notify the N UEs of the first downlink data channel resource, so that the N UEs receive, according to the instruction of the first scheduling control signaling, the first data sent by the base station on the first downlink data channel resource.

As an embodiment of the present invention, the sending, by the base station, the one piece of first scheduling control signaling on the first downlink control channel resource specifically is:

scrambling, by the base station, the one piece of first scheduling control signaling by using one identifier, where the one identifier is an identifier, notified by the base station to the N UEs, corresponding to one UE among the N UEs.

Specifically, in a configuration process, the base station may configure N different identifiers respectively to N UEs, and then notify other UEs among the N UEs of an identifier of one UE among the N UEs by sending related control signaling or interaction message to the other UEs among the N UEs, where the control signaling or interaction message may be scrambled by using the identifier configured by the base station for the UE.

Hence, the N UEs all can detect and descramble, according to the identifier of the one UE, the first scheduling control signaling sent by the base station on the first downlink control channel resource, so as to receive, according to the instruction of the first scheduling control signaling, the first data on the first downlink data channel resource.

As another embodiment of the present invention, when the base station sends the one piece of first scheduling control signaling on the first downlink control channel resource, the base station may regard the N UEs as one group, and configure the same identifier to the N UEs. Specifically, the sending, by the base station, the one piece of first scheduling control signaling on the first downlink control channel resource includes:

scrambling, by the base station, the one piece of scheduling control signaling by using a common identifier, where the common identifier is configured by the base station for the N UEs; and sending, by the base station, the one piece of first scheduling control signaling scrambled by using the common identifier on the first downlink control channel resource.

That is, in the embodiment, the base station configures one common identifier for the group tow which the N UEs belong, scrambles, by using the common identifier, the first scheduling control signaling to be sent to the group, and then sends the first scheduling control signaling scrambled by using the identifier, so that UEs in the one group all can detect, upon detecting the scheduling control signaling sent to the group, descramble the first scheduling control signaling by using the common identifier, so as to receive, according to instruction information of the first scheduling control signaling, the first data from the first downlink data channel resource.

As an embodiment of the present invention, in step S103 of the embodiment of the present invention, the sending, by the base station, the first data on the first downlink data channel resource specifically may be:

sending, by the base station, the first data by sending one protocol data unit on the first downlink data channel resource, where the protocol data unit includes first receive indication information used to respectively instruct each UE of the N UEs to receive the first data in the protocol data unit, or the protocol data unit is used to respectively instruct each UE of the N UEs to discard fourth data in the protocol data unit, so that each UE of the N UEs receive data of the first data included in the protocol data unit. The fourth data is partial or all data other than the first data in the protocol data unit.

As an embodiment of the present invention, the protocol data unit may further include second receive indication information for instruct one or more UEs among the N UEs to receive fifth data in the protocol data unit. Hence, the base station only needs to send one protocol data unit by using the same downlink data channel resource, so as to instruct the N UEs to receive the first data, and instruct one or more UEs of the N UEs to receive the fifth data in the protocol data unit. Hence, different data receiving instructions are completed according to scheduling requirements of each UE in one data scheduling process, which greatly improves data transmission efficiency. In such cases, the fifth data may be partial or all data other than the first data, or partial or all data other than the fourth data in the protocol data unit.

Figure 4:
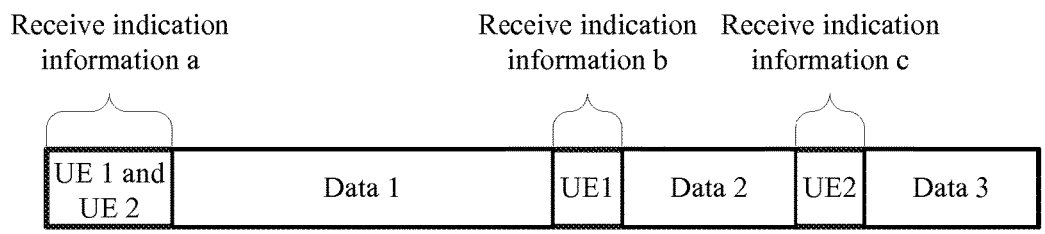
FIG. 4 is a schematic diagram of a downlink data channel resource.

For example, as shown in FIG. 4, in a protocol data unit, receive indication information a instructs UE 1 and UE 2 to receive data 1; receive indication information b instructs UE 1 to receive data 2; and receive indication information c instructs UE 2 to receive data 3. Hence, UE 1 and UE 2 may, according to obtained receive indication information, determine to receive data that is commonly required in the protocol data unit, discard data not required in the protocol data unit, and selectively receive partial data in the protocol data unit according to scheduling requirements of the UE itself. It should be noted that a structure of the protocol data unit in FIG. 4 is described as an example. The structure of the protocol data unit according to the embodiment of the present invention is not limited thereto. For example, all receive indication information may be placed in a header of the protocol data unit.

As an embodiment of the present invention, after step S102 and before step S103, the base station may send scheduling rule information of the first scheduling control signaling to the N UEs, so that the N UEs detects the first scheduling control signaling in a frame, a subframe, or a period complying with the scheduling rule information.

In the embodiment of the present invention, the first scheduling control signaling to be detected by the UE is not scheduling control signaling separately sent to the one UE; therefore, the UE needs to constantly detect different signaling search spaces to detect the first scheduling control signaling. Hence, in the embodiment, specifically, the base station may notify, by using broadcast or related control signaling, such as RRC signaling, the UE of scheduling rule information related to a frame number, a subframe number, or a period for sending the first scheduling control signaling, so that the UE detects the scheduling control signaling in the frame, subframe, or period complying with the configured rule. The UE detects the first scheduling control signaling carrying the first downlink data channel resource information only in a transmission time interval satisfying the scheduling rule, so as to achieve an objective of energy saving.

As an embodiment of the present invention, after step S102 and before step S103, the base station may also send search space configuration information to the N UEs, so that the N UEs detects the first scheduling control signaling in a search space corresponding to the search space configuration information.

Based on the same reason why the base station sends the scheduling rule information of the first scheduling control signaling, in order to prevent the UE from constantly detecting different signaling search spaces, in this embodiment specifically, the base station may notify, by using broadcast or related control signaling, such as RRC signaling, the UE of search space configuration information of the first scheduling control signaling, so that the UE detects the first scheduling control signaling carrying the first downlink data channel resource information on a time-frequency resource corresponding to the first scheduling control signaling, so as to achieve an objective of energy saving.

It should be noted that, both or one of the scheduling rule information and the search space configuration information may be sent, where no limit is set herein.

In this embodiment, a base station may, when being required to send the same data to multiple UEs, send downlink data by using the same downlink data channel resource, so that each UE receives the data from the same downlink data channel resource. This saves a transmission bandwidth, and improves a resource utilization rate of a communication system.

The following describes the related implementation principle of the embodiments illustrated in FIG. 1 to FIG. 5 of the present invention by using a UE as an executing entity.

Figure 5:
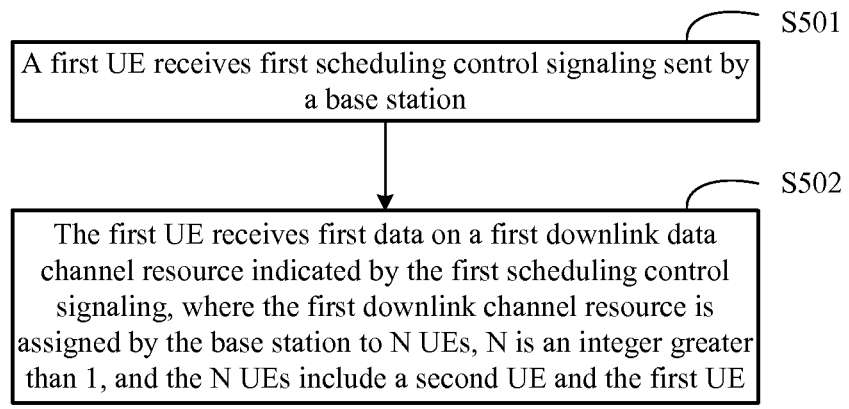
FIG. 5 is a flowchart for implementing a method for receiving downlink data according to an embodiment of the present invention.

FIG. 5 shows an implementation procedure of a method for receiving downlink data according to an embodiment of the present invention. In this embodiment, an executing entity of the procedure is a UE, which is described in detail as follows.

In step S501, a first UE receive first scheduling control signaling sent by a base station.

In step S502, the first UE receive first data on a first downlink data channel resource indicated by the first scheduling control signaling, where the first downlink data channel resource is assigned by the base station to N UEs, N is an integer greater than 1, and the N UEs include a second UE and the first UE.

In this embodiment, the first scheduling control signaling received by the first UE may be one of N pieces of first scheduling control signaling sent by the base station on a first downlink control channel resource respectively to the N UEs, so that the N UEs respectively receive the first data on the first downlink data channel resource by using the N pieces of first scheduling control signaling. The first scheduling control signaling received by the first UE may also be one first scheduling control signaling sent by the base station on the first downlink control channel resource, so that the N UEs all receive the first data on the first downlink data channel resource by receiving the first scheduling control signaling.

In the embodiment of the present invention, the UE, upon receiving related data on the downlink data channel resource, may check the data by using cyclic redundancy check (Cyclic Redundancy Check, CRC). If the checking passes, the downlink data of the base station is received successfully; otherwise, the downlink data failed to be received.

As an embodiment of the present invention, when the first scheduling control signaling received by the first UE is one of the N pieces of first scheduling control signaling corresponding to the N UEs that are sent by the base station on the first downlink control channel resource respectively to the N UEs, the first scheduling control signaling may further include related information for indicating a second downlink data channel resource, so that the first UE to receive second data on the second downlink data channel resource indicated by the first scheduling control signaling.

As another embodiment of the present invention, in a subframe where the first scheduling control signaling is located, the first UE may also receive second scheduling control signaling, so as to receive third data on a third downlink data channel resource indicated by the second scheduling control signaling.

Hence, in one scheduling process, the UE may receive data on multiple downlink data channel resources, which greatly improves transmission efficiency of a system.

Moreover, further, when the first scheduling control signaling received by the first UE is one of the N pieces of first scheduling control signaling corresponding to the N UEs that are sent by the base station on the first downlink control channel resource respectively to the N UEs, the first UE may descramble the first scheduling control signaling by using an identifier corresponding to the first UE, and receive the descrambled first scheduling control signaling.

Moreover, further, when the first scheduling control signaling received by the first UE is the one first scheduling control signaling sent by the base station to the N UEs, the first UE may descramble the first scheduling control signaling by using an identifier corresponding to the second UE, and receive the descrambled first scheduling control signaling, where the identifier corresponding to the second UE is configured to the second UE and notified to the first UE by the base station.

Alternatively, further, the first UE may descramble the first scheduling control signaling by using a common identifier of the N UEs, and receive the descrambled first scheduling control signaling, where the common identifier is configured by the base station for the N UEs.

Figure 6:
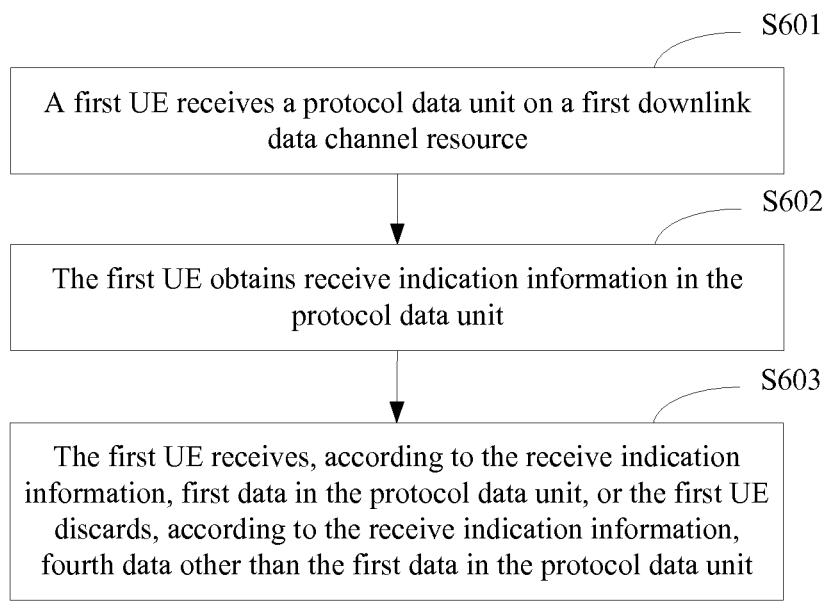
FIG. 6 is a flowchart for specifically implementing step S502 of a method for receiving downlink data according to an embodiment of the present invention.

As shown in the embodiment illustrated in FIG. 4 of the present invention, when the base station sends one protocol data unit on the first downlink data channel resource, as shown in FIG. 6, step S502 specifically is:

step S601: receiving, by the first UE, a protocol data unit on the first downlink data channel resource;

step S602: obtaining, by the first UE, receive indication information in the protocol data unit; and step S603: receiving, by the first UE according to the receive indication information, the first data in the protocol data unit, or discarding, by the first UE according to the receive indication information, fourth data other than the first data in the protocol data unit.

Further, the protocol data unit further includes second receive indication information for instructing the first UE to receive fifth data in the protocol data unit.

As an embodiment of the present invention, before step S601, the method further includes:

receiving, by the first UE, scheduling rule information of the first scheduling control signaling sent by the base station, where the scheduling rule information notifies the first UE of information about a frame, a subframe, or a period for receiving the first scheduling control signaling.

Correspondingly, step S601 specifically includes:

detecting, by the first UE, the first scheduling control signaling in the frame, the subframe, or the period complying with the scheduling rule information.

As another embodiment of the present invention, before step S601, the method further includes:

receiving, by the first UE, search space configuration information sent by the base station.

Correspondingly, step S601 specifically includes:

detecting, by the first UE, the first scheduling control signaling in a search space corresponding to the search space configuration information.

It should be noted that, a related implementation principle of related embodiments not described in the embodiment on the UE side may correspond to related embodiments of the present invention where the base station is described as an executing entity, which is not described repeatedly herein.

Figure 7:
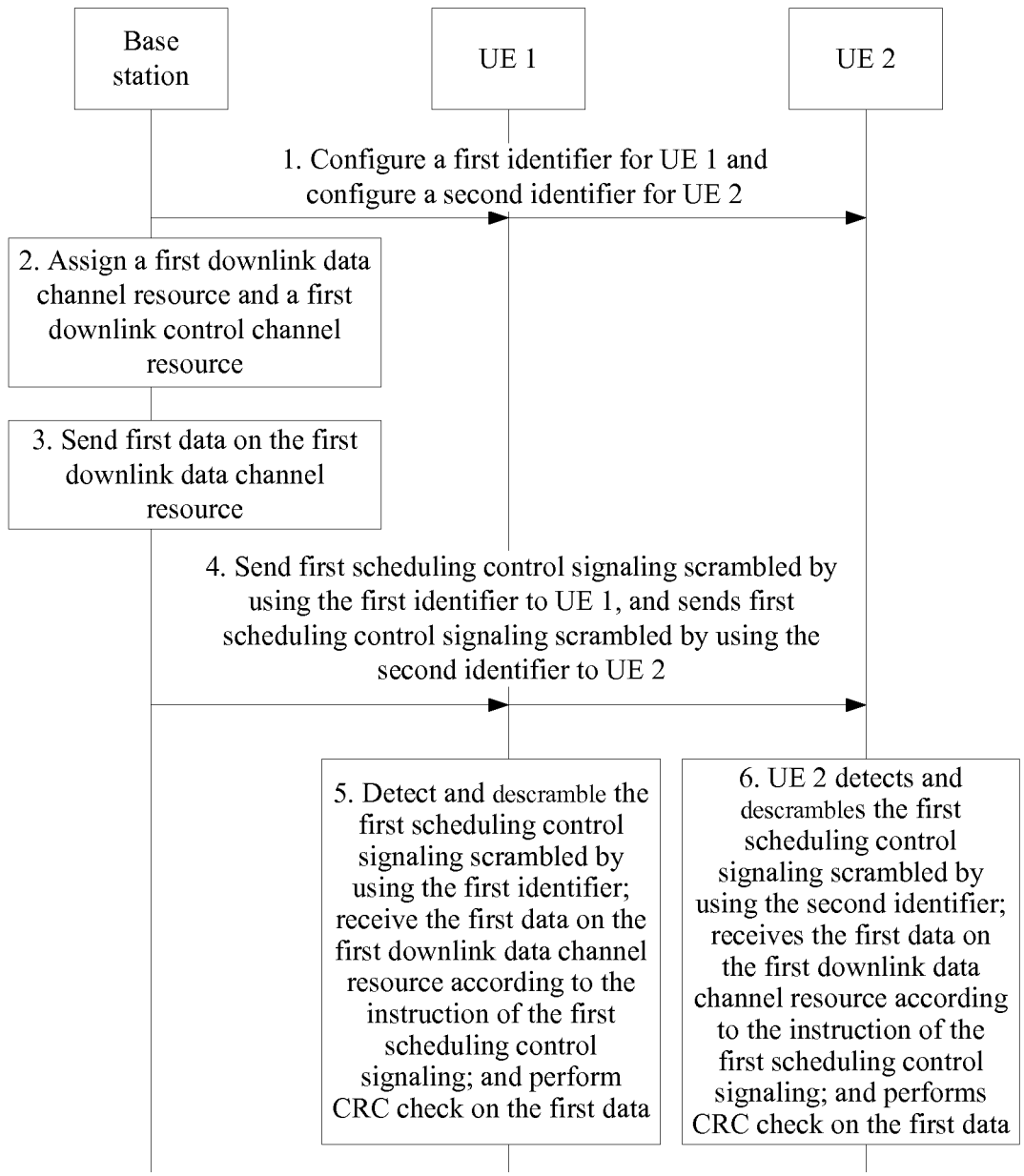
FIG. 7 is an interaction flowchart of a downlink data transmission method according to an embodiment of the present invention.

FIG. 7 shows an interaction flowchart of a downlink data transmission method according to an embodiment of the present invention by using a data scheduling process between UE 1 and UE 2 as an example, which is described in detail as follows:

1. A base station configures a first identifier for UE 1 and configures a second identifier for UE 2.

2. The base station assigns a first downlink data channel resource and a first downlink control channel resource.

3. The base station sends first data on the first downlink data channel resource.

4. The base station sends first scheduling control signaling scrambled by using the first identifier to UE 1, and the base station sends first scheduling control signaling scrambled by using the second identifier to UE 2.

5. UE 1 detects and descramble the first scheduling control signaling scrambled by using the first identifier; receives the first data on the first downlink data channel resource according to an instruction of the first scheduling control signaling; performs CRC check on the first data; and if the checking passes, UE 1 receives the first data successfully; otherwise, UE 1 fails to receive the first data.

6. UE 2 detects and descramble the first scheduling control signaling scrambled by using the second identifier; receives the first data on the first downlink data channel resource according to an instruction of the first scheduling control signaling; performs CRC check on the first data; and if the checking passes, UE 2 receives the first data successfully; otherwise, UE 2 fails to receive the first data.

In the interaction process described above, the first scheduling control signaling sent by the base station may further instruct UE 1 and/or UE 2 to receive second data on a second downlink data channel resource; or the base station may further send second scheduling control signaling scrambled by using the first identifier or second scheduling control signaling scrambled by using the second identifier, so as to instruct UE 1 and/or UE 2 to receive third data on a third downlink data channel resource.

Figure 8:
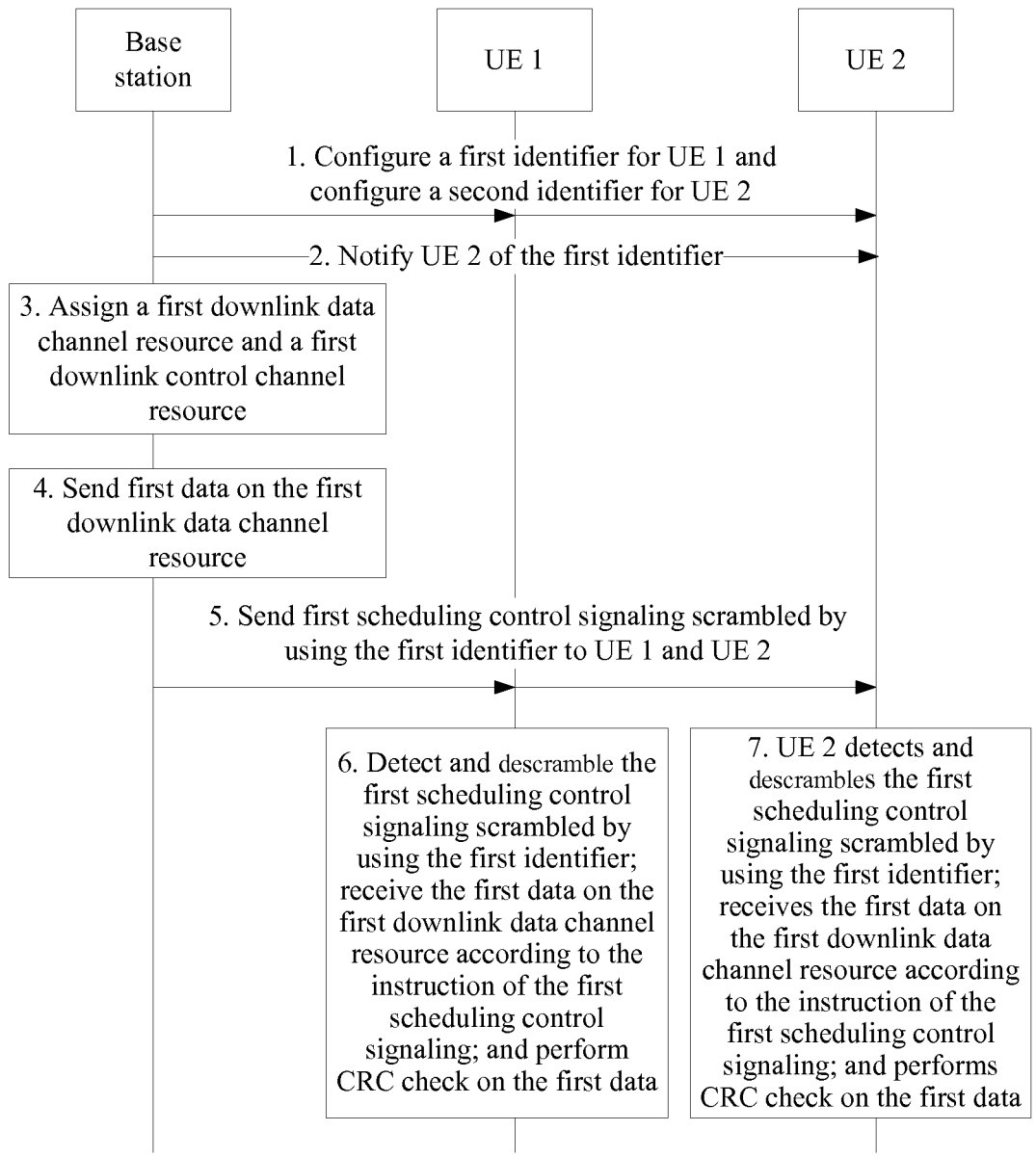
FIG. 8 is an interaction flowchart of a downlink data transmission method according to another embodiment of the present invention.

FIG. 8 shows an interaction flowchart of a downlink data transmission method according to another embodiment of the present invention by using a data scheduling process between UE 1 and UE 2 as an example, which is described in detail as follows:

1. A base station configures a first identifier for UE 1 and configures a second identifier for UE 2.

2. The base station notifies UE 2 of the first identifier of UE 1.

3. The base station assigns a first downlink data channel resource and a first downlink control channel resource.

4. The base station sends first data on the first downlink data channel resource.

5. The base station sends first scheduling control signaling scrambled by using the first identifier to UE 1 and UE 2.

6. UE 1 detects and descramble the first scheduling control signaling scrambled by using the first identifier; receives the first data on the first downlink data channel resource according to an instruction of the first scheduling control signaling; performs CRC check on the first data; and if the checking passes, UE 1 receives the first data successfully; otherwise, UE 1 fails to receive the first data.

7. UE 2 detects and descramble the first scheduling control signaling scrambled by using the first identifier; receives the first data on the first downlink data channel resource according to an instruction of the first scheduling control signaling; performs CRC check on the first data; and if the checking passes, UE 2 receives the first data successfully; otherwise, UE 2 fails to receive the first data.

In the interaction process described above, the base station may further configure one common identifier for UE 1 and UE 2, and sends first scheduling control signaling scrambled by using the common identifier, which is not described herein.

Figure 9:
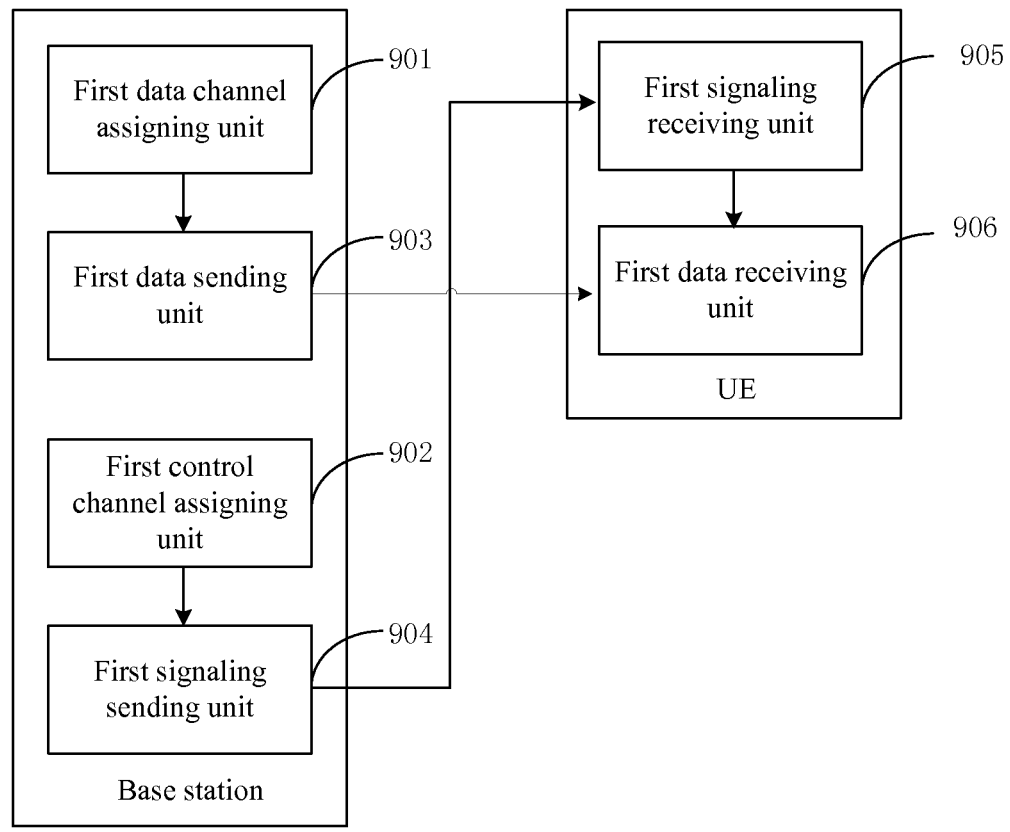
FIG. 9 is a structural block diagram of a downlink data transmission device according to an embodiment of the present invention.

FIG. 9 shows a structural block diagram of a downlink data transmission device according to an embodiment of the present invention, where the device is located respectively in a base station and a UE, and is configured to respectively run the method for sending downlink data according to the embodiments illustrated in FIG. 1 to FIG. 4 of the present invention and the method for receiving downlink data according to the embodiments illustrated in FIG. 5 to FIG. 6 of the present invention. For the convenience of description, only parts relevant to the embodiments are shown.

Referring to FIG. 9, in the base station, the device includes:

a first data channel assigning unit 901, configured to assign a first downlink data channel resource to N UEs, where N is an integer greater than 1;

a first control channel assigning unit 902, configured to assign a first downlink control channel resource to the N UEs;

a first data sending unit 903, configured to obtain the first downlink data channel resource transferred by the first data channel assigning unit 901, and send first data on the first downlink data channel resource; and a first signaling sending unit 904, configured to obtain the first downlink control channel resource from the first control channel assigning unit 902, and send first scheduling control signaling on the first downlink control channel resource, where the first scheduling control signaling is used to notify the N UEs of the first downlink data channel resource, so that the N UEs receive the first data on the first downlink data channel resource.

Alternatively, the first signaling sending unit 904 is specifically configured to send N pieces of first scheduling control signaling respectively corresponding to the N UEs on the first downlink control channel resource, where the N pieces of first scheduling control signaling are used to respectively notify the N UEs of the first downlink data channel resource.

Alternatively, the first signaling sending unit 904 includes:

a first scrambling subunit, configured to scramble the N pieces of first scheduling control signaling respectively by using N identifiers corresponding to the N UEs, where the N identifiers are configured by the base station respectively for the N UEs; and a first sending subunit, configured to receive the N pieces of scrambled first scheduling control signaling from the first scrambling subunit, and send the N pieces of scrambled first scheduling control signaling on the first downlink control channel resource.

Alternatively, in the base station, the device further includes:

a second data channel assigning unit, configured to assign a second downlink data channel resource to one or more UEs among the N UEs; and a second data sending unit, configured to obtain the second downlink data channel resource from the second data channel assigning unit, and send second data on the second downlink data channel resource; where one or more pieces of first scheduling control signaling among the N pieces of first scheduling control signaling are further used to indicate the second downlink data channel resource, so that one or more UEs respectively corresponding to the one or more pieces of first scheduling control signaling receive the second data on the second downlink data channel resource.

Alternatively, in the base station, the device further includes:

a third data channel assigning unit, configured to assign a third downlink data channel resource to one or more UEs among the N UEs;

a second control channel assigning unit, configured to assign a second downlink control channel resource to the one or more UEs;

a third data sending unit, configured to obtain the third downlink data channel resource from the third data channel assigning unit, and send third data on the third downlink data channel resource; and a second signaling sending unit, configured to obtain the second downlink control channel resource from the second control channel assigning unit, and send one or more pieces of second scheduling control signaling respectively corresponding to the one or more UEs on the second downlink control channel resource, where the one or more pieces of second scheduling control signaling are used to indicate the third downlink data channel resource, and the one or more pieces of second scheduling control signaling and the N pieces of first scheduling control signaling are in the same subframe, so that the one or more UEs receive the third data on the third downlink data channel resource.

Alternatively, the first signaling sending unit 904 is specifically configured to send one piece of first scheduling control signaling on the first downlink control channel resource, where the one piece of first scheduling control signaling is used to notify the N UEs of the first downlink data channel resource.

Alternatively, the first signaling sending unit 904 includes:

a second scrambling subunit, configured to scramble the one piece of first scheduling control signaling by using one identifier, where the one identifier is an identifier, notified by the base station to the N UEs, corresponding to one UE among the N UEs; and a second sending subunit, configured to receive the one piece of scheduling control signal scrambled by using the one identifier from the second scrambling subunit, and send the one piece of first scheduling control signaling scrambled by using the one identifier on the first downlink control channel resource.

Alternatively, the first signaling sending unit 904 includes:

a third scrambling subunit, configured to scramble the one piece of first scheduling control signaling by using a common identifier, where the common identifier is configured by the base station for the N UEs; and a third sending subunit, configured to receive the one piece of first scheduling control signaling scrambled by using the common identifier from the third scrambling subunit, and send the one piece of first scheduling control signaling scrambled by using the common identifier on the first downlink control channel resource.

Alternatively, the first data sending unit 903 is specifically configured to send the first data by sending one protocol data unit on the first downlink data channel resource, where the protocol data unit includes first receive indication information, and the first receive indication information is used to respectively instruct each UE of the N UEs to receive the first data in the protocol data unit, or used to respectively instruct teach UE of the N UEs to discard fourth data in the protocol data unit.

Alternatively, the protocol data unit further includes second receive indication information, where the second receive indication information is used to instruct one or more UEs among the N UEs to receive fifth data in the protocol data unit.

Alternatively, in the base station, the device further includes:

a first information sending unit, configured to send scheduling rule information of the first scheduling control signaling to the N UEs, so that the N UEs detect the first scheduling control signaling in a frame, a subframe, or a period complying with the scheduling rule information; and/or a second information sending unit, configured to send search space configuration information to the N UEs, so that the N UEs detect the first scheduling control signaling in a search space corresponding to the search space configuration information.

In the UE, the device includes:

a first signaling receiving unit 905, configured to receive first scheduling control signaling sent by a base station; and a first data receiving unit, configured to receive the first scheduling control signaling transferred by the first signaling receiving unit 905, and receive first data on a first downlink data channel resource indicated by the first scheduling control signaling, where the first downlink data channel resource is configured by the base station for N UEs, N is an integer greater than 1, and the N UEs includes a second UE and the UE.

Alternatively, in the UE, the device further includes:

a second data receiving unit, configured to receive the first scheduling control signaling transferred by the first signaling receiving unit 905, and receive second data on a second downlink data channel resource indicated by the first scheduling control signaling.

Alternatively, in the UE, the device further includes:

a second signaling receiving unit, configured to receive second scheduling control signaling in a subframe where the first scheduling control signaling is located; and a third data receiving unit, configured to receive the second scheduling control signaling transferred by the second signaling receiving unit, and receive third data on a third downlink data channel resource indicated by the second scheduling control signaling.

Alternatively, the first signaling receiving unit 905 is specifically configured to descramble the first scheduling control signaling by using the identifier corresponding to the UE, and receive the descrambled first scheduling control signaling.

Alternatively, the first signaling receiving unit 905 is specifically configured to descramble the first scheduling control signaling by using an identifier corresponding to the second UE, and receive the descrambled first scheduling control signaling, where the identifier of the second UE is notified by the base station; or specifically configured to descramble the first scheduling control signaling by using a common identifier of the N UEs, and receive the descrambled first scheduling control signaling, where the common identifier is configured by the base station for the N UEs.

Alternatively, the first data receiving unit 906 includes:

a protocol data unit receiving subunit, configured to receive a protocol data unit on the first downlink data channel resource;

a receive indication information obtaining subunit, configured to receive the protocol data unit transferred by the protocol data unit receiving subunit, and obtain receive indication information in the protocol data unit and a receiving subunit, configured to receive the receive indication information transferred by the receive indication information obtaining subunit, and receive the first data in the protocol data unit according to the receive indication information; or discard fourth data other than the first data in the protocol data unit according to the receive indication information.

Alternatively, the protocol data unit further includes second receive indication information, where the second receive indication information is used to instruct the UE to receive fifth data in the protocol data unit.

Alternatively, in the UE, the device further includes:

a scheduling rule information receiving unit, configured to receive scheduling rule information of the first scheduling control signaling sent by the base station, where the scheduling rule information notifies the UE of information about a frame, a subframe, or a period for receiving the first scheduling control signaling; and the first signaling receiving unit 905 is specifically configured to receive the scheduling rule information transferred by the scheduling rule information receiving unit, and detect the first scheduling control signaling in a frame, a subframe, or a period complying with the scheduling rule information.

Alternatively, in the UE, the device further includes:

a search space configuration information receiving unit, configured to receive search space configuration information sent by the base station; and the first signaling receiving unit 905 is specifically configured to receive the search space configuration information transferred by the search space configuration information receiving unit, and detect the first scheduling control signaling in a search space corresponding to the search space configuration information.

Figure 10:
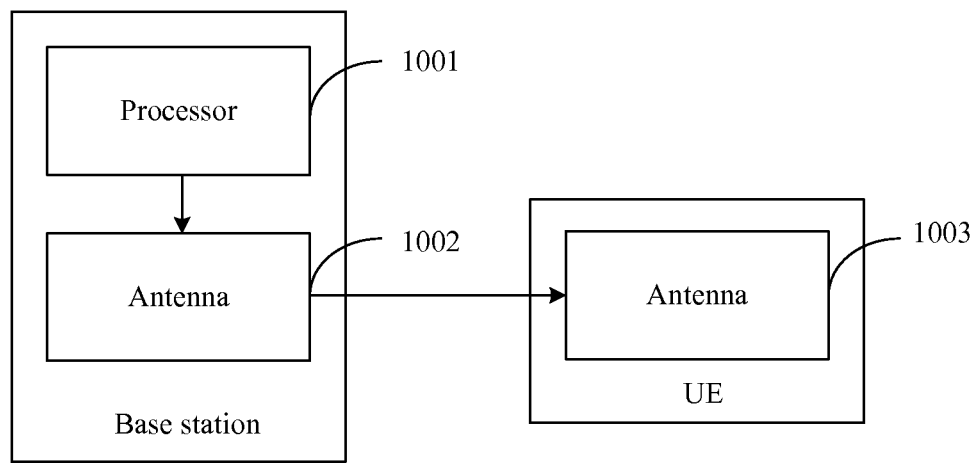
FIG. 10 is a hardware structural block diagram of a downlink data transmission device according to an embodiment of the present invention.

FIG. 10 shows a hardware structural block diagram of a downlink data transmission device according to an embodiment of the present invention, where the device is located respectively in a base station and a UE, and is configured to respectively run the method for sending downlink data according to the embodiments illustrated in FIG. 1 to FIG. 4 of the present invention and the method for receiving downlink data according to the embodiments illustrated in FIG. 5 to FIG. 6 of the present invention. For the convenience of description, only parts relevant to the embodiments are shown.

Referring to FIG. 10, in the base station, the device includes:

a processor 1001, configured to assign a first downlink data channel resource to N UEs, and assign a first downlink control channel resource to the N UEs, where N is an integer greater than 1; and an antenna 1002, configured to obtain the first downlink data channel resource from the processor 1001, and send first data on the first downlink data channel resource; and obtain the first downlink control channel resource from the processor, and send first scheduling control signaling on the first downlink control channel resource, where the first scheduling control signaling is used to notify the N UEs of the first downlink data channel resource, so that the N UEs receive the first data on the first downlink data channel resource.

Alternatively, the antenna 1002 is specifically configured to send N pieces of first scheduling control signaling respectively corresponding to the N UEs on the first downlink control channel resource, where the N pieces of first scheduling control signaling are used to respectively notify the N UEs of the first downlink data channel resource.

Alternatively, the processor 1001 is specifically configured to scramble the N pieces of first scheduling control signaling respectively by using N identifiers corresponding to the N UEs, where the N identifiers are configured by the base station respectively for the N UEs; and the antenna 1002 is specifically configured to receive the N pieces of scrambled first scheduling control signaling from the processor 1001, and send the N pieces of scrambled first scheduling control signaling on the first downlink control channel resource.

Alternatively, the processor 1001 is further configured to assign a second downlink data channel resource to one or more UEs among the N UEs; and the antenna 1002 is further configured to obtain the second downlink data channel resource from the processor 1001, and send second data on the second downlink data channel resource; where one or more pieces of first scheduling control signaling among the N pieces of first scheduling control signaling are further used to indicate the second downlink data channel resource, so that one or more UEs respectively corresponding to the one or more pieces of first scheduling control signaling receive the second data on the second downlink data channel resource.

Alternatively, the processor 1001 is further configured to assign a third downlink data channel resource to one or more UEs among the N UEs; and further configured to assign a second downlink control channel resource to the one or more UEs; and the antenna 1002 is further configured to obtain the third downlink data channel resource from the processor 1001, and send third data on the third downlink data channel resource; and further configured to obtain the second downlink control channel resource from the processor 1001, and send one or more pieces of second scheduling control signaling respectively corresponding to the one or more UEs on the second downlink control channel resource, where the one or more pieces of second scheduling control signaling are used to indicate the third downlink data channel resource, and the one or more pieces of second scheduling control signaling and the N pieces of first scheduling control signaling are in the same subframe, so that the one or more UEs receive the third data on the third downlink data channel resource.

Alternatively, the antenna 1002 is specifically configured to send one piece of first scheduling control signaling on the first downlink control channel resource, where the one piece of first scheduling control signaling is used to notify the N UEs of the first downlink data channel resource.

Alternatively, the processor 1001 is specifically configured to scramble the one piece of scheduling control signaling by using one identifier, where the one identifier is an identifier, notified by the base station to the N UEs, corresponding to one UE among the N UEs; and the antenna 1002 is specifically configured to receive the one piece of scheduling control signal scrambled by using the one identifier from the processor 1001, and send the one piece of first scheduling control signaling scrambled by using the one identifier on the first downlink control channel resource.

Alternatively, the processor 1001 is specifically configured to scramble the one piece of first scheduling control signaling by using a common identifier, where the common identifier is configured by the base station for the N UEs; and the antenna 1002 is specifically configured to receive the one piece of scheduling control signal scrambled by using the common identifier from the processor 1001, and send the one piece of first scheduling control signaling scrambled by using the common identifier on the first downlink control channel resource.

Alternatively, the antenna 1002 is specifically configured to send the first data by sending one protocol data unit on the first downlink data channel resource, where the protocol data unit includes first receive indication information, and the first receive indication information is used to respectively instruct each UE of the N UEs to receive the first data in the protocol data unit, or used to respectively instruct teach UE of the N UEs to discard fourth data in the protocol data unit.

Alternatively, the protocol data unit further includes second receive indication information, where the second receive indication information is used to instruct one or more UEs among the N UEs to receive fifth data in the protocol data unit.

Alternatively, the antenna 1002 is further configured to send scheduling rule information of the first scheduling control signaling to the N UEs, so that the N UEs detect the first scheduling control signaling in a frame, a subframe, or a period complying with the scheduling rule information; and/or the antenna 1002 is further configured to send search space configuration information to the N UEs, so that the N UEs detect the first scheduling control signaling in a search space corresponding to the search space configuration information.

In the UE, the device includes an antenna 1003, configured to receive first scheduling control signaling sent by a base station; and the antenna 1003 is further configured to receive first data on a first downlink data channel resource indicated by the first scheduling control signaling, where the first downlink data channel resource is assigned by the base station to N UEs, N is an integer greater than 1, and the N UEs include a second UE and the first UE.

Alternatively, the antenna 1003 is specifically configured to receive second data on a second downlink data channel resource indicated by the first scheduling control signaling.

Alternatively, the antenna 1003 is further configured to receive second scheduling control signaling in a subframe where the first scheduling control signaling is located; and receive third data on a third downlink data channel resource indicated by the second scheduling control signaling.

Alternatively, the antenna 1003 is specifically configured to descramble the first scheduling control signaling by using the identifier corresponding to the UE, and receive the descrambled first scheduling control signaling.

Alternatively, the antenna 1003 is specifically configured to descramble the first scheduling control signaling by using an identifier corresponding to the second UE, and receive the descrambled first scheduling control signaling, where the identifier of the second UE is notified by the base station; or the antenna 1003 is specifically configured to descramble the first scheduling control signaling by using a common identifier of the N UEs, and receive the descrambled first scheduling control signaling, where the common identifier is configured by the base station for the N UEs.

Alternatively, the antenna 1003 is specifically configured to receive a protocol data unit on the first downlink data channel resource; obtain receive indication information in the protocol data unit; and receive the first data in the protocol data unit according to the receive indication information, or discard fourth data other than the first data in the protocol data unit according to the receive indication information.

Alternatively, the protocol data unit further includes second receive indication information, where the second receive indication information is used to instruct the UE to receive fifth data in the protocol data unit.

Alternatively, the antenna 1003 is further configured to receive scheduling rule information of the first scheduling control signaling sent by the base station, where the scheduling rule information notifies the UE of information about a frame, a subframe, or a period for receiving the first scheduling control signaling; and detect the first scheduling control signaling in the frame, the subframe, or the period complying with the scheduling rule information.

Alternatively, the antenna 1003 is further configured to receive search space configuration information sent by the base station; and detect the first scheduling control signaling in a search space corresponding to the search space configuration information.

In the embodiments of the present invention, a base station may, when being required to send the same data to multiple UEs, send downlink data by using the same downlink data channel resource, so that each UE receives the same data from the same downlink data channel resource. This saves a transmission bandwidth, and improves a resource utilization rate of a communication system.

A person of ordinary skill in the art may appreciate that, in combination with the examples described in the embodiments disclosed in this specification, units and algorithm steps may be implemented by electronic hardware, computer software, or a combination thereof. In order to clearly describe the interchangeability between the hardware and the software, the foregoing has generally described compositions and steps of every embodiment according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It can be clearly understood by a person skilled in the art that, for the purpose of convenient and brief description, for a detailed working process of the foregoing system, apparatus and unit, reference may be made to the corresponding process in the method embodiments, and the details will not be described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units herein may be selected according to the actual needs to achieve the objectives of the solutions of the embodiments of the present invention.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit are implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program codes, such as a USB flash disk, a removable hard disk, a read-only memory (Read-Only Memory, ROM), a random access memory (Random Access Memory, RAM), a magnetic disk, or an optical disk.

The foregoing descriptions are merely exemplary embodiments of the present invention, but are not intended to limit the present invention. Any modifications, equivalent replacements, or improvements made within the spirit and principle of the present invention shall fall within the protection scope of the present invention.

What is claimed is:

1. A method for sending downlink data, comprising:
   assigning, by a base station, a same first downlink data channel resource to a plurality of N user equipments UEs, wherein N is an integer greater than 1;
   assigning, by the base station, a first downlink control channel resource to the plurality of N UEs; and
   sending, by the base station, first data on the same first downlink data channel resource, and sending first scheduling control signaling on the first downlink control channel resource, wherein the first scheduling control signaling is used to notify the plurality of N UEs of the same first downlink data channel resource, so that the plurality of N UEs receive the first data on the same first downlink data channel resource.

2. The method according to claim 1, wherein the sending, by the base station, the first scheduling control signaling on the first downlink control channel resource comprises:
   sending, by the base station, N pieces of first scheduling control signaling respectively corresponding to the plurality of N UEs on the first downlink control channel resource, wherein the N pieces of first scheduling control signaling are used to respectively notify the plurality of N UEs of the same first downlink data channel resource.

3. The method according to claim 2, wherein the sending, by the base station, the N pieces of first scheduling control signaling on the first downlink control channel resource comprises:
   scrambling, by the base station, the N pieces of first scheduling control signaling respectively by using N identifiers corresponding to the plurality of N UEs, wherein the N identifiers are configured by the base station respectively for the plurality of N UEs; and
   sending, by the base station, the N pieces of scrambled first scheduling control signaling on the first downlink control channel resource.

4. The method according to claim 2, wherein before the sending, by the base station, the first scheduling control signaling on the first downlink control channel resource, the method further comprises:
   assigning, by the base station, a second downlink data channel resource to one or more UEs among the plurality of N UEs; and
   after the assigning, by the base station, the second downlink data channel resource to the one or more UEs among the plurality of N UEs, the method further comprises:
   sending, by the base station, second data on the second downlink data channel resource, wherein one or more pieces of first scheduling control signaling among the N pieces of first scheduling control signaling are further used to indicate the second downlink data channel resource, so that the one or more UEs respectively corresponding to the one or more pieces of first scheduling control signaling receive the second data on the second downlink data channel resource.

5. The method according to claim 2 wherein before the sending, by the base station, the first scheduling control signaling on the first downlink control channel resource, the method further comprises:
   assigning, by the base station, a third downlink data channel resource to one or more UEs among the plurality of N UEs;
   assigning, by the base station, a second downlink control channel resource to the one or more UEs; and after the assigning, by the base station, the second downlink control channel resource to the one or more UEs, the method further comprises:

sending, by the base station, third data on the third downlink data channel resource, and sending one or more pieces of second scheduling control signaling respectively corresponding to the one or more UEs on the second downlink control channel resource, wherein the one or more pieces of second scheduling control signaling are used to indicate the third downlink data channel resource, and the one or more pieces of second scheduling control signaling and the N pieces of first scheduling control signaling are in the same subframe, so that the one or more UEs receive the third data on the third downlink data channel resource.

6. A method for receiving downlink data, comprising:
receiving, by a first user equipment UE, first scheduling control signaling sent by a base station; and
receiving, by the first UE, first data on a same first downlink data channel resource indicated by the first scheduling control signaling, wherein the same first downlink data channel resource is assigned by the base station to a plurality of N UEs, N is an integer greater than 1, and the plurality of N UEs comprise a second UE and the first UE.

7. The method according to claim 6, wherein after the receiving, by the first UE, the first scheduling control signaling sent by the base station, the method further comprises:
receiving, by the first UE, second data on a second downlink data channel resource indicated by the first scheduling control signaling.

8. The method according to claim 6, wherein before the receiving, by the first UE, the first data on the same first downlink data channel resource indicated by the first scheduling control signaling, the method further comprises:
receiving, by the UE, second scheduling control signaling in a subframe wherein the first scheduling control signaling is located; and
after the receiving, by the UE, the second scheduling control signaling in the subframe wherein the first scheduling control signaling is located, the method further comprises:
receiving, by the UE, third data on a third downlink data channel resource indicated by the second scheduling control signaling.

9. The method according to claim 6, wherein the receiving, by the first UE, the first scheduling control signaling sent by the base station comprises:
descrambling, by the first UE, the first scheduling control signaling by using an identifier corresponding to the first UE, and receiving the descrambled first scheduling control signaling.

10. The method according to claim 6, wherein the receiving, by the first UE, the first scheduling control signaling sent by the base station comprises:
descrambling, by the first UE, the first scheduling control signaling by using an identifier corresponding to the second UE, and receiving the descrambled first scheduling control signaling, wherein the identifier corresponding to the second UE is notified by the base station; or
descrambling, by the first UE, the first scheduling control signaling by using a common identifier of the plurality of N UEs, and receiving the descrambled first scheduling control signaling, wherein the common identifier is configured by the base station for the plurality of N UEs.

11. A base station, comprising:
a memory; and
a processor coupled to the memory and configured to assign a same first downlink data channel resource to a plurality of N user equipments UEs, and assign a first downlink control channel resource to the plurality of N UEs, wherein N is an integer greater than 1; and
an antenna coupled to the processor and configured to obtain the same first downlink data channel resource from the processor, and send first data on the same first downlink data channel resource; and obtain the first downlink control channel resource from the processor, and send first scheduling control signaling on the first downlink control channel resource, wherein the first scheduling control signaling is used to notify the plurality of N UEs of the same first downlink data channel resource, so that the plurality of N UEs receive the first data on the same first downlink data channel resource.

12. The base station according to claim 11, wherein the antenna is specifically configured to send N pieces of first scheduling control signaling respectively corresponding to the plurality of N UEs on the first downlink control channel resource, wherein the N pieces of first scheduling control signaling are used to respectively notify the plurality of N UEs of the same first downlink data channel resource.

13. The base station according to claim 12, wherein the processor is specifically configured to scramble the N pieces of first scheduling control signaling respectively by using N identifiers corresponding to the plurality of N UEs, wherein the N identifiers are configured by the base station respectively for the plurality of N UEs; and
the antenna is specifically configured to receive the N pieces of scrambled first scheduling control signaling from the processor, and send the N pieces of scrambled first scheduling control signaling on the first downlink control channel resource.

14. The base station according to claim 12, wherein the processor is further configured to assign a second downlink data channel resource to one or more UEs among the plurality of N UEs; and
the antenna is further configured to obtain the second downlink data channel resource from the processor, and send second data on the second downlink data channel resource; wherein
one or more pieces of first scheduling control signaling among the N pieces of first scheduling control signaling are further used to indicate the second downlink data channel resource, so that one or more UEs respectively corresponding to the one or more pieces of first scheduling control signaling receive the second data on the second downlink data channel resource.

15. The base station according to claim 12, wherein the processor is further configured to assign a third downlink data channel resource to one or more UEs among the plurality of N UEs, and further configured to assign a second downlink control channel resource to the one or more UEs; and
the antenna is further configured to obtain the third downlink data channel resource from the processor, and send the third data on the third downlink data channel resource; and further configured to obtain the second downlink control channel resource from the processor, and send one or more pieces of second scheduling control signaling respectively corresponding to the one or more UEs on the second downlink control channel resource, wherein the one or more pieces of second scheduling control signaling are used to indicate the third downlink data channel resource, and the one or more pieces of second scheduling control signaling and the N pieces of first scheduling control signaling are in the same subframe, so that the one or more UEs receive the third data on the third downlink data channel resource.

16. A user equipment UE, comprising an antenna, wherein the antenna is configured to receive first scheduling control signaling sent by a base station; and the antenna is further configured to receive first data on a same first downlink data channel resource indicated by the first scheduling control signaling, wherein the same first downlink data channel resource is assigned by the base station to a plurality of N UEs, N is an integer greater than 1, and the plurality of N UEs comprise a second UE and the first UE.

17. The UE according to claim 16, wherein the antenna is specifically configured to receive second data on a second downlink data channel resource indicated by the first scheduling control signaling.

18. The UE according to claim 17, wherein the antenna is further configured to receive second scheduling control signaling in a subframe wherein the first scheduling control signaling is located; and receive third data on a third downlink data channel resource indicated by the second scheduling control signaling.

19. The UE according to claim 16, wherein the antenna is specifically configured to descramble the first scheduling control signaling by using an identifier corresponding to the UE, and receive the descrambled first scheduling control signaling.

20. The UE according to claim 16, wherein the antenna is specifically configured to descramble the first scheduling control signaling by using an identifier corresponding to the second UE, and receive the descrambled first scheduling control signaling, wherein the identifier corresponding to the second UE is notified by the base station; or the antenna is specifically configured to descramble the first scheduling control signaling by using a common identifier of the plurality of N UEs, and receive the descrambled first scheduling control signaling, wherein the common identifier is configured by the base station for the plurality of N UEs.

* * * * *